United States Patent [19]

Ikka et al.

[11] Patent Number: 5,418,285
[45] Date of Patent: May 23, 1995

[54] MAGNETIC RECORDING MEDIUM

[75] Inventors: Masahiko Ikka; Tomoki Horiguchi; Yoshiyuki Yasuhara, all of Fukui, Japan

[73] Assignee: Nissin Chemical Industry Co., Inc., Fukui, Japan

[21] Appl. No.: 88,773

[22] Filed: Jul. 8, 1993

[30] Foreign Application Priority Data

Jul. 21, 1992 [JP] Japan .................. 4-215506

[51] Int. Cl.⁶ .............................. C08F 8/32
[52] U.S. Cl. ........................ 525/59; 525/60; 525/61; 525/243; 525/295; 525/379; 525/382
[58] Field of Search .............. 525/59, 60, 61, 293, 525/295, 328.2

[56] References Cited

U.S. PATENT DOCUMENTS 3,875,090  4/1975  Levy ........................... 525/61
5,037,893  8/1991  Nakachi et al. ............ 525/328.2

*Primary Examiner*—Bernard Lipman
*Attorney, Agent, or Firm*—Wyatt, Gerber, Burke & Badie

[57] ABSTRACT

Proposed is a novel vinyl chloride-based copolymeric resin suitable as an electron beam-curable binder resin for forming a magnetic recording layer of a magnetic recording medium. The binder resin is a vinyl chloride-based copolymeric resin containing monomeric units having a hydroxy group which is reacted with an ethylenically unsaturated monomeric compound having an isocyanato group in a molecule and then subjected to a modification reaction with an amine compound. The magnetic recording medium, e.g., magnetic recording tape, prepared by using the binder resin is excellent in the surface properties such as gloss and traveling resistance as well as in the magnetic properties such as residual magnetic flux density and squareness ratio of the magnetic hysteresis loop.

6 Claims, No Drawings

MAGNETIC RECORDING MEDIUM

BACKGROUND OF THE INVENTION

The present invention relates to a magnetic recording medium or, more particularly, to a magnetic recording medium such as audiotapes, videotapes, floppy discs and the like comprising a nonmagnetic substrate and a magnetic recording layer formed thereon consisting of a matrix phase of a cured resinous composition and fine particles of a ferromagnetic material uniformly dispersed in the matrix as the binder as well as to a novel resin composition suitable as the binder resin.

In the technology of magnetic recording media of the above mentioned type, it is practiced in recent years that the surface of a substrate is coated with a magnetic coating composition prepared by uniformly dispersing ferromagnetic particles and other optional ingredients in a radiation-curable synthetic resin followed by drying and curing of the radiation-curable resin by the irradiation with radiation such as high-energy electron beams to form a magnetic recording layer.

Various types of radiation-curable resins have been developed and practically used for the purpose including, for example, urethane acrylate oligomers obtained by introducing acrylic acid into the molecular chain ends of a urethane oligomer by forming an ester linkage, those obtained by the addition reaction of a (meth)acrylate having an epoxy group or carboxyl group to the hydroxy groups of a polymer such as vinyl chloride-vinyl acetate-vinyl alcohol copolymers and those obtained by the addition reaction of a monovinyl monoisocyanato adduct prepared by the addition of a diisocyanate to a monomeric compound having a hydroxy group and a (meth)acrylic group in an approximately equivalent amount to the hydroxy groups in a vinyl chloride-based copolymer.

These prior art binder resins for a magnetic coating composition have problems and disadvantages in common that dispersion of the ferromagnetic particles in the coating composition is not always as good as desired, that the viscosity of the coating composition is relatively high due to the long-chain branched units bonded to the hydroxy groups and that the film strength of the magnetic coating layer formed from the magnetic coating composition is not always high enough.

Various attempts and proposals have been made heretofore to solve the above described problems in the prior art binder resins for magnetic recording media. For example, Japanese Patent Kokai No. 61-59621 proposes a resin obtained by the reaction of isocyanatoethyl methacrylate with a prepolymer having hydroxy groups. Although the problems relative to the viscosity of the magnetic coating composition and the film strength of the magnetic recording layer could be solved by using this resin as a vehicle of the coating composition, no sufficient improvement can be achieved in the dispersibility of ferromagnetic particles in the coating composition and this deficiency is still increased when a ferromagnetic powder having a decreased particle size is used with an object to obtain a magnetic recording medium suitable for high-density recording.

Further, Japanese Patent Kokai No. 4-67314 proposes a resin which is a reaction product of a vinyl chloride-based copolymer having hydroxy groups and polar groups other than hydroxy in a molecule and a monomeric compound having at least one ethylenically unsaturated double bond and an isocyanato group in a molecule but having no urethane linkages in the molecule. When a magnetic coating composition is prepared by using a vinyl chloride-based copolymeric resin having sulfonic acid groups, phosphoric acid groups or carboxyl groups as the polar groups other than hydroxy according to the disclosure in the above mentioned patent document, however, it is found that the improvement in the dispersibility of the ferromagnetic particles in the coating composition is not always as satisfactory as desired. This is presumably because the isocyanato groups in the above mentioned monomeric compound react not only with the hydroxy groups in the vinyl chloride-based copolymeric resin but also with the polar groups other than the hydroxy to cause a decrease in the improving effect of the copolymeric resin on the dispersibility of the ferromagnetic particles by the polar groups other than the hydroxy groups. Further, it is a very difficult matter to independently control the content of the unreacted hydroxy groups and the content of the unreacted polar groups other than hydroxy, which are introduced with an object to improve the dispersibility and orientation of the ferromagnetic particles, so that high performance of the magnetic coating composition with stability can hardly be ensured.

SUMMARY OF THE INVENTION

The present invention accordingly has an object, in view of the above described problems and disadvantages in the prior art magnetic recording media or, in particular, in the conventional resins used as a binder in a magnetic coating composition for the preparation of a magnetic recording medium, to provide a novel curable resin capable of giving a magnetic coating composition exhibiting good workability in the coating work with good dispersibility of any finest ferromagnetic particles as well as to provide a novel magnetic recording medium having a magnetic recording layer of excellent properties as formed by using a magnetic coating composition prepared from the novel binder resin.

Thus, the resin of the present invention suitable as a binder in a magnetic coating composition for forming a magnetic recording layer on a non-magnetic substrate to give a magnetic recording medium is an amine-modified reaction product of a vinyl chloride-based copolymer having hydroxy group-containing monomeric units with a monomeric compound having, in a molecule, an ethylenically unsaturated double bond and an isocyanato group but no urethane linkage.

The magnetic recording medium of the invention accordingly comprises:
(a) a non-magnetic substrate; and
(b) a magnetic recording layer on the surface of the substrate which consists of the above defined resin in a cured form as a matrix phase and particles of a ferromagnetic material uniformly dispersed in the matrix phase of the cured resin.

DETAILED DESCRIPTION OF THE PREFERRED EMBODIMENTS

As is described above, the most characteristic feature of the inventive magnetic layer consists in the use of a specific resin as a binder of the ferromagnetic particles to form a magnetic recording layer on a non-magnetic substrate.

The binder resin of the invention is derived from a vinyl chloride-based copolymer having hydroxy group-containing monomeric units in the molecule, which is exemplified by those copolymers comprising a vinyl alcohol moiety as the constituting monomeric units such as vinyl chloride-vinyl acetate-vinyl alcohol copolymers, vinyl chloride-vinyl alcohol copolymers and copolymers obtained by the copolymerization of vinyl chloride with a vinyl monomer having a hydroxy-containing monovalent organic group in a molecule. The vinyl chloride-based copolymer having a vinyl alcohol moiety is obtained by the full or partial saponification of a copolymer of vinyl chloride and vinyl acetate.

Examples of the above mentioned vinyl monomer having a hydroxy-containing monovalent organic group include: for example: 2-hydroxyethyl acrylate; vinyl 2-hydroxy propionate; allyl 2-hydroxyethyl ether; allyl 2-hydroxypropyl ether; 4-hydroxybutyl acrylate; 2-hydroxypropyl acrylate; 2-hydroxybutyl methacrylate; 2-hydroxy-3-chloropropyl methacrylate; 2-hydroxyethyl methacrylate; 2-hydroxypropyl methacrylate; vinyl 2-hydroxyethyl ether; vinyl 4-hydroxybutyl ether; and the like. It is preferable that the hydroxy group-containing monomeric units are introduced into the vinyl chloride-based copolymeric resin in the form of a vinyl alcohol moiety or in the form of a hydroxypropyl acrylate moiety. The vinyl alcohol units in turn can be obtained by the copolymerization of vinyl acetate with vinyl chloride followed by the saponification of the vinyl acetate units.

The content of the vinyl alcohol units or the monomeric units derived from the above named hydroxy-containing vinyl monomer in the hydroxy-containing vinyl chloride-based copolymer is in the range from 0.6 to 26% by moles or, preferably, from 1.4 to 14% by moles relative to the overall monomeric units. When the content of the hydroxy-containing monomeric units in the copolymer is too small, the copolymer would have insufficient reactivity with the monomeric compound having an ethylenically unsaturated double bond and an isocyanato group but having no urethane linkage in the molecule resulting in a decrease in the curability of the copolymer, for example, by the irradiation with radiation along with a decrease in the dispersibility of ferromagnetic particles in a magnetic coating composition with the copolymer as the vehicle resin and an eventual decrease in the miscibility of the copolymer with other optional resinous additives such as polyurethane resins used according to need. When the content of the hydroxy-containing monomeric units in the copolymer is too large, on the other hand, the mechanical film strength of the magnetic recording layer formed by using the copolymer as a binder is decreased badly affecting the durability of the magnetic recording medium.

It is optional according to need that the hydroxy-containing vinyl chloride-based copolymer contains other types of monomeric units in a limited amount besides the above mentioned essential monomeric units. Examples of monomers from which the above mentioned optional monomeric units are derived include, for example, vinyl esters such as vinyl propionate, esters of (meth)acrylic acid such as ethyl acrylate and propyl methacrylate, epoxy group-containing monomers such as glycidyl methacrylate and allyl glycidyl ether, carboxyl group-containing monomers such as maleic acid, mono(2-ethylhexyl)maleate and acrylic acid, monomers having a phosphoric acid group in the free acid form such as mono(methacryloyloxyethyl) acid phosphate, and mono(acryloyloxy polyoxypropyleneglycol) acid phosphate as well as metal salt forms thereof, sulfonic acid group-containing monomers or metal salt forms thereof such as sodium vinyl sulfonate and sodium methallyl sulfonate, and the like.

The above described hydroxy-containing vinyl chloride-based copolymer is first reacted with a monomeric compound having, in a molecule, an ethylenically unsaturated double bond and an isocyanato group but having no urethane linkage. Examples of such a monomeric compound include 2-isocyanatoethyl (meth)acrylate and methacryloyl isocyanate.

The reaction between the hydroxy-containing vinyl chloride-based copolymer and the above described isocyanato group-containing monomeric compound is carried out by dissolving these two reactants in a suitable organic solvents such as toluene, cyclohexanone, methyl isobutyl ketone and the like with addition of a catalyst for the formation of urethane linkages such as dibutyl tin dilaurate, dibutyl tin oxide and the like and a radical polymerization inhibitor such as hydroquinone and the like and heating the solution at a temperature in the range from 50° to 90° C. It is preferable that an as large as possible amount or at least 5% by moles of the hydroxy groups in the hydroxy-containing vinyl chloride-based copolymer are reacted with the ethylenically unsaturated isocyanato group-containing monomeric compound in consideration of the curability of the resin to form a magnetic recording layer.

The thus obtained reaction product of the hydroxy-containing vinyl chloride-based copolymer and the isocyanato group-containing ethylenically unsaturated monomeric compound is then modified by the reaction with an amine compound which may be aliphatic, alicyclic or aromatic. Examples of suitable amine compounds include, for example, methylamine, ethylamine, propylamine, butylamine, cyclohexyl amine, ethanol amine, naphthyl amine, aniline, o-toluidine, diethyl amine, dibutyl amine, dioctyl amine, diisobutyl amine, diethanol amine, diamino propane, hexamethylene diamine, methyl ethanol amine, dimethyl ethanol amine, dibutyl ethanol amine, methyl diethanol amine, 2-methoxyethyl amine, di-2-methoxyethyl amine, N-methyl aniline, trimethyl amine, triethyl amine, tributyl amine, triethanol amine, dimethyl benzyl amine, tetramethyl ethylene diamine, tetramethyl-1,3-diamino propane, $\alpha$-picoline, $\beta$-picoline, $\gamma$-picoline, 2,4-lutidine, quinoline, morpholine and the like.

The amount of the amine compound to be used in the modification reaction of the copolymeric resin after the reaction with the isocyanato group-containing monomeric compound is selected preferably in such a way that the content of the vinyl units modified with the amine compound in the copolymeric resin is in the range from 0.05 to 5% by weight. The modification reaction with the amine compound is carried out by adding the amine compound to the reaction mixture after the reaction of the hydroxy-containing vinyl chloride-based copolymer with the isocyanato group-containing ethylenically unsaturated monomeric compound and heating the mixture at a temperature in the range from 40° to 70° C. for about 8 hours under agitation.

Although the position into which the amine molecules are introduced in the molecules of the copolymeric resin is not quite clear, it can be experimentally evidenced that the amine compound is not as a mere mixture with the copolymeric resin but chemically bonded to the copolymeric resin because the copolymeric resin after the amine-modification reaction contains nitrogen even after repeated purification, for example, by reprecipitation. The content of the amine-modified vinylic monomer units in the copolymeric resin after the modification reaction can be determined by calculation from the content of nitrogen determined by the elementary analysis for nitrogen according to the ter Meulen method. In the preparation of a magnetic coating composition by using the thus prepared amine-modified copolymeric resin, the resin as the vehicle can be used either in the form of a liquid reaction mixture as prepared by the amine-modification reaction or in a powdery form after purification by reprecipitation and drying.

It is optional according to need in the preparation of a magnetic coating composition by using the copolymeric resin obtained in the above described manner as a binder resin of the ferromagnetic particles that another resin of a different type is used in combination as a part of the binder resin although the amount of such an optional resin should not exceed the amount of the specific amine-modified vinyl chloride-based copolymeric resin of the invention. Examples of the resins which can be used as an optional binder resin of the magnetic coating composition include polyurethane resins, nitrocelluloses, polyester resins, epoxy resins, polyamide resins, phenolic resins, alkyd resins and polyvinyl butyral resins.

Various kinds of ferromagnetic powders can be used in the preparation of the magnetic recording medium according to the invention including oxide ferromagnetics such as iron oxides, e.g., $Fe_2O_3$ and $Fe_3O_4$, as such or containing cobalt ions by doping or adsorption and chromium oxide $CrO_2$, metallic magnetics having an acicular particle configuration of a metal or alloy such as Fe, Co, Fe—Co, Ni and the like and other known magnetic materials. The amount of the specific amine-modified vinyl chloride-based copolymeric resin as a binder relative to the ferromagnetic particles in the magnetic coating composition is preferably in the range from 8 to 50 parts by weight per 100 parts by weight of the ferromagnetic particles.

In the preparation of a magnetic coating composition by uniformly dispersing the ferromagnetic particles in the binder resin as the matrix phase or the vehicle of the coating composition, it is optional without particular limitations as in conventional magnetic coating compositions that the coating composition is admixed with various kinds of known additives conventionally used in magnetic coating compositions such as lubricants, abrasives, antistatic agents, dispersion aids, rustproof agents and the like and the coating composition is diluted to have a consistency suitable for the coating work by the addition of an organic solvent such as methyl ethyl ketone, methyl isobutyl ketone, cyclohexanone, toluene and the like.

The non-magnetic material forming the substrate of the magnetic recording medium can be conventional including synthetic resins such as polyester resins, polyolefins, cellulose acetates, polycarbonate resins and the like, non-magnetic metals such as aluminum and alloys thereof and ceramic materials. The substrate for practical use is in the form of a film, tape, sheet, disc and the like.

The binder resin of the present invention can be cured, though not limitative, by the irradiation with radiation so that a magnetic recording medium is prepared by coating at least one surface of the substrate with the magnetic coating composition followed by drying, calendering and irradiation with radiation to cure the binder resin in the coating layer although it is a possible way that the irradiation with radiation precedes the calendering treatment, optionally, followed by a second irradiation treatment with radiation. Various kinds of high-energy radiations can be used to effect curing of the binder resin including X-rays, $\gamma$-rays, electron beams, $\beta$-rays and the like, of which electron beams are preferred. The irradiation dose with electron beams is preferably in the range from 1 to 20 Mrads or, more preferably, in the range from 2 to 6 Mrads when the line speed of the irradiation system is taken into consideration. Various electron beam accelerators suitable for the purpose are available on the market, of which Electrocurtain systems made by Energy Science Corp., U.S.A., and the scanning-type electron beam accelerator made by Polymaphysics Co., Germany, can be used satisfactorily. The electron beam irradiation to effect curing of the binder resin is performed preferably in an atmosphere of an inert gas such as helium and the like because damages on the instrument by the ozone generated in the irradiation in an oxygen-containing atmosphere can be prevented thereby in addition to the preventing effect on the curing inhibition by the atmospheric oxygen.

It is sometimes an advisable way that the magnetic coating composition is admixed with a vinyl group-containing monomeric compound as a reactive diluent in place of or in combination with a conventional organic solvent so that the organic solvent can be omitted or the amount thereof can be reduced. Examples of such a reactive diluent include tetraethyleneglycol di(meth)acrylate, 1,6-hexanediol di(meth)acrylate, pentaerithritol tri(meth)acrylate, trimethylol propane tri(meth)acrylate, polyfunctional (meth)acrylates sold under the tradenames of M-5100 and M-6100 (each a product by Toa Gosei Kagaku Kogyo Co.), epoxy acrylates sold under the tradenames of 40EM, 70PA and 80MFA (each a product by Kyoeisha Yushi Kagaku Kogyo Co.) and so on.

In the following, the binder resin of the present invention and a magnetic recording medium prepared by using the binder resin are illustrated in more detail by way of examples, in which the term of "parts" always refers to "parts by weight", although the scope of the present invention is never limited by these examples in any way.

Synthetic Example 1

Into a reaction vessel equipped with a stirrer, reflux condenser, thermometer and dropping funnel were introduced 300 parts of a vinyl chloride-based copolymeric resin consisting of 91% by weight of the vinyl chloride moiety, 3% by weight of the vinyl acetate moiety and 6% by weight of the vinyl alcohol moiety and having an average degree of polymerization of 400 together with 200 parts of toluene and 200 parts of methyl isobutyl ketone to form a reaction mixture which was heated under agitation up to a temperature of 60° C. to dissolve the copolymeric resin in the solvent mixture. Thereafter, 34.1 parts of isocyanatoethyl methacrylate were added drop-wise over a period of 1 hour at a uniform rate into the reaction mixture in the vessel with admixture of 0.1 part of dibutyl tin dilaurate and 0.3 part of hydroquinone followed by temperature elevation to 80° C. and further continued agitation for additional 6 hours to complete the reaction. Completion of the reaction could be confirmed by taking an infrared absorption spectrum of the reaction mixture showing disappearance of the absorption assignable to the free isocyanato groups. After cooling down to 40° C., the reaction mixture was admixed with 1 part of methyl alcohol and 3 parts of dibutyl amine and further agitated for additional 8 hours to effect the amine-modification reaction followed by cooling to room temperature. Thereafter, the reaction mixture was gradually admixed with 3000 parts of methyl alcohol to precipitate the copolymeric resin which was freed from the mother liquor and washed twice with 3000 parts of methyl alcohol and then once with 3000 parts of water followed by drying to obtain an amine-modified copolymeric resin, which is referred to as the polymer I hereinbelow, in the form of a dry powder. The content of the amine-modified vinylic monomer units in this polymer I was 0.7% by weight.

Synthetic Example 2

Another amine-modified copolymeric resin, which is referred to as the polymer II hereinbelow, was prepared in the same manner as in Synthetic Example 1 excepting replacement of the vinyl chloride-based copolymeric resin as the starting material with the same amount of a copolymeric resin of vinyl chloride, vinyl acetate and hydroxypropyl acrylate, of which the contents of the vinyl chloride moiety, vinyl acetate moiety and hydroxypropyl acrylate moiety were 81%, 4% and 15% by weight, respectively, having an average degree of polymerization of 450, decrease of the amount of isocyanatoethyl methacrylate to 16 parts and replacement of 3 parts of dibutyl amine with 4 parts of dimethyl ethanolamine. The content of the amine-modified vinylic monomer units in this polymer II was 1.6% by weight.

Synthetic Example 3

A third amine-modified copolymeric resin, which is referred to as the polymer III hereinbelow, in the form of a solution was prepared in the same manner as in Synthetic Example 1 excepting replacement of the vinyl chloride-based copolymeric resin as the starting material with the same amount of a copolymeric resin of vinyl chloride, vinyl acetate, hydroxypropyl acrylate and sodium vinyl sulfonate, of which the contents of the respective monomeric moieties were 84%, 5%, 10% and 1% by weight, respectively, increase of the amount of isocyanatoethyl methacrylate to 35.8 parts and replacement of dibutyl amine with the same amount of morpholine. The content of the amine-modified vinylic monomer units in this polymer III was 1.2% by weight.

Synthetic Example 4

A fourth amine-modified copolymeric resin, which is referred to as the polymer IV hereinbelow, was prepared in the same manner as in Synthetic Example 1 excepting replacement of 34.1 parts of isocyanatoethyl methacrylate with 24.4 parts of methacryloyl isocyanate.

Synthetic Example 5

A fifth amine-modified copolymeric resin, which is referred to as the polymer V hereinbelow, in the form of a solution was prepared in the same manner as in Synthetic Example 2 excepting replacement of 34.1 parts of isocyanatoethyl methacrylate with a combination of 11 parts of isocyanatoethyl methacrylate and 4 parts of methacryloyl isocyanate and omission of the purification of the amine-modified copolymeric resin by reprecipitation.

Synthetic Example 6 (comparative)

A sixth copolymeric resin, which is referred to as the polymer VI hereinbelow, was prepared in the same manner as in Synthetic Example 1 excepting omission of the amine-modification reaction with dibutyl amine after the reaction of the vinyl chloride-based copolymeric resin with isocyanatoethyl methacrylate and omission of the resin precipitates with methyl alcohol.

Synthetic Example 7 (comparative)

A seventh copolymeric resin after modification with an amine, which is referred to as the polymer VII hereinbelow, was prepared in the following manner. Thus, 300 parts of the same copolymeric resin as used in Synthetic Example 2 were introduced into a reaction vessel equipped with a stirrer, reflux condenser, thermometer and dropping funnel together with 200 parts of toluene and 200 parts of methyl isobutyl ketone to form a mixture which was heated at 40° C. under agitation to dissolve the resin in the solvent mixture. Thereafter, the resin solution was admixed with 1 part of methyl alcohol and 4 parts of dimethyl ethanolamine and the mixture was agitated at 40° C. for 8 hours followed by cooling to room temperature. The amine-modified copolymeric resin in this reaction mixture was purified by reprecipitation in the same manner as in Synthetic Example 1. The content of the amine-modified vinylic monomer units in this polymer VII was 1.6% by weight.

Synthetic Example 8 (comparative)

An eighth copolymeric resin, which is referred to as the polymer VIII hereinbelow, was prepared in the same manner as in Synthetic Example 1 excepting replacement of the vinyl chloride-based copolymeric resin as the starting material with the same amount of a copolymeric resin consisting of the monomeric moieties of vinyl chloride, vinyl acetate, vinyl alcohol and vinyl sulfonic acid in the contents of 91%, 2%, 6% and 1% by weight, respectively, and omission of the amine-modification reaction with dibutyl amine after the reaction of the starting copolymeric resin with isocyanatoethyl methacrylate.

Example 1

A magnetic coating composition was prepared by uniformly blending, first with a laboratory mixer for 90 minutes and then in an Eiger mill containing glass beads for 3 hours, 100 parts of the polymer I obtained in Synthetic Example 1,355 parts of a cobalt-doped gamma-iron oxide powder, 540 parts of cyclohexanone, 400 parts of toluene, 50 parts of a polyurethane resin (N-2304, a product by Nippon Polyurethane Kogyo Co.), 5 parts of carbon black and 2 parts of lecithin.

A polyester film having a thickness of 15 μm was coated with this magnetic coating composition in a coating thickness of 4 μm after drying. The workability in coating was satisfactory. After an orientation treatment of the magnetic particles in a magnetic field, drying and calendering, the coating layer on the polyester film was irradiated with electron beams in a dose of 5 Mrads under an atmosphere of nitrogen by using an electron beam irradiation machine (Electrocurtain CB-150, manufactured by Energy Science Corp.) to prepare a magnetic recording tape by curing the binder resin in the coating layer.

The thus obtained magnetic recording tape was subjected to the evaluation tests for the physical properties of the coating film and the magnetic properties relative to the items shown below to give the results summarized in Table 1. The testing procedure for each of the testing items was as described below.

each with the polymers II to IV and VI to VIII, respectively. In Example 5, the magnetic coating composition was prepared by admixing 220 parts of the resin solution of the polymer V corresponding to 100 parts of the solid resin with 470 parts of cyclohexanone and 350 parts of toluene, the other experimental conditions being substantially the same as in Example 1. The results obtained in the evaluation tests are shown in Table 1.

TABLE 1

| Polymer No. | I | II | III | IV | V | VI | VII | VIII |
|---|---|---|---|---|---|---|---|---|
| Surface gloss, % | 125 | 123 | 124 | 123 | 125 | 85 | 121 | 110 |
| Residual magnetic flux density, G | 1460 | 1440 | 1450 | 1450 | 1460 | 1250 | 1420 | 1380 |
| Squareness ratio | 0.81 | 0.80 | 0.81 | 0.80 | 0.81 | 0.70 | 0.79 | 0.77 |
| Durability | A | A | A | A | A | B | D | B |
| Traveling resistance | low | low | low | low | low | high | medium | medium |

(a) Surface gloss of magnetic recording layer

The 60° reflectivity of the coated surface before the calendering treatment was measured by using a gloss meter (manufactured by Murakami Shikisai Gijutsu Kenkyusho) and the ratio of the value to that of a reference glass plate in % was recorded.

(b) Residual magnetic flux density Br and squareness ratio

Measurements were performed by using a vibrated-sample magnetometer (manufactured by Toei Kogyo Co.).

(c) Durability

The magnetic recording tape after storage for 168 hours in an atmosphere of 90% relative humidity at 65° C. was brought into contact under a load of 100 g with a rotating drum carrying an abrasive paper attached to the surface at a revolution of 150 rpm and the degree of transfer of the magnetic coating layer to the abrasive surface of the drum after 1000 revolutions was visually examined and rated in four ratings of A, B, C and D according to the following criteria.

A: absolutely no transfer
B: very little transfer
C: a little transfer
D: large amount of transfer (d) Traveling resistance The magnetic recording tape was brought into contact with the abrasive surface of a rotating drum in the same manner as in the evaluation of the durability and the force generated between the surface of the magnetic recording layer and the drum surface was measured with a U-gauge in an atmosphere of 80% relative humidity at 65° C. and the results were recorded in three ratings of low, medium and high resistance against traveling of the tape.

Examples 2 to 5 and Comparative Examples 1 to 3

The experimental procedure in each of Examples 2 to 4 and Comparative Examples 1 to 3, including preparation of a magnetic coating composition and magnetic recording tape as well as evaluation tests thereof, was substantially the same as in Example 1 described above excepting replacement of the polymer I in Example 1

What is claimed is:

1. A resin useful as a binder of ferromagnetic particles to form a magnetic recording layer of a magnetic recording medium which is a reaction product obtained by first reacting a hydroxy containing vinyl chloride-based copolymeric resin with an olefinic monomer containing an ethylenically unsaturated double bond and an isocyanato group but having no urethane linkage, and thereafter mixing resulting reaction product with an amine compound and heating the mixture at a temperature of 40° to 70° C.

2. The resin as claimed in claim 1 in which the hydroxy group-containing monomeric unit is contained in the vinyl chloride-based copolymeric resin in the form of a vinyl alcohol moiety or hydroxypropyl acrylate moiety.

3. The resin as claimed in claim 1 in which the content of the hydroxy group-containing monomeric units in the vinyl chloride-based copolymeric resin is in the range from 0.6 to 26% by moles relative to the overall amount of the monomeric units.

4. The resin as claimed in claim 1 in which the ethylenically unsaturated compound having an isocyanato group in a molecule is selected from the group consisting of 2-isocyanatoethyl acrylate, 2-isocyanatoethyl methacrylate and methacryloyl isocyanate.

5. The resin as claimed in claim 1 in which at least 5% by moles of the hydroxy groups in the vinyl chloride-based copolymeric resin having hydroxy group-containing monomeric units are reacted with the ethylenically unsaturated compound having an isocyanato group in a molecule.

6. The resin as claimed in claim 1 in which the reaction product of a vinyl chloride-based copolymeric resin having hydroxy group-containing monomeric units in a molecule and an ethylenically unsaturated compound having an isocyanato group in a molecule is modified with the amine compound in such an amount that the content of the vinyl units modified with the amine compound in the amine-modified copolymeric resin is in the range from 0.05 to 5% by weight.

* * * * *